United States Patent [19]

Hutson

[11] Patent Number: 4,845,822

[45] Date of Patent: Jul. 11, 1989

[54] O-RING INSERTION APPARATUS

[75] Inventor: Richard C. Hutson, Dorset, England

[73] Assignee: Clive Neal Taylor, Christchurch, United Kingdom

[21] Appl. No.: 124,992

[22] PCT Filed: Jan. 14, 1987

[86] PCT No.: PCT/GB87/00016

§ 371 Date: Sep. 11, 1987

§ 102(e) Date: Sep. 11, 1987

[87] PCT Pub. No.: WO87/04105

PCT Pub. Date: Jul. 16, 1987

[30] Foreign Application Priority Data

Jan. 14, 1986 [GB] United Kingdom ................. 8600782

[51] Int. Cl.⁴ ............................................ B23P 19/02

[52] U.S. Cl. .................................................... 29/235

[58] Field of Search .......................... 29/235, 450, 451

[56] References Cited

U.S. PATENT DOCUMENTS 3,851,369 12/1974 Escholz .
4,141,129 2/1979 Martini .

FOREIGN PATENT DOCUMENTS 883877 12/1980 Belgium .
137907 4/1985 European Pat. Off. .
2444896 4/1975 Fed. Rep. of Germany .
2551363 5/1977 Fed. Rep. of Germany .
1553824 1/1969
1072949 6/1967 United Kingdom .

OTHER PUBLICATIONS

N.T.I.S. Tech. Notes, Apr. 1984, Marshall Space Flight Center: "Retaining-Ring Installation Tool".
Machine Design, vol. 40, Mar. 28, 1968, "Piston-Face Wobble Inserts Oversized O-Ring", pp. 151-158.

*Primary Examiner*—Robert C. Watson
*Attorney, Agent, or Firm*—Renner, Otto, Boisselle & Sklar

[57] ABSTRACT

Apparatus for use in inserting a flexible O-ring into a groove provided in a workpiece, comprising a first piston and cylinder device provided with a hollow piston rod having a slot through which an O-ring is fed by a chute into the hollow piston rod, a plunger which is moved by a second piston to push the O-ring along the hollow piston rod, and radially extending flexible members are provided on the plunger to deform the O-ring as it is moved along the hollow piston rod, the first piston and cylinder device being used to move the hollow piston rod so that its free end lies adjacent to the groove so that when the plunger pushes the O-ring out of the hollow piston rod it enters the groove.

11 Claims, 1 Drawing Sheet

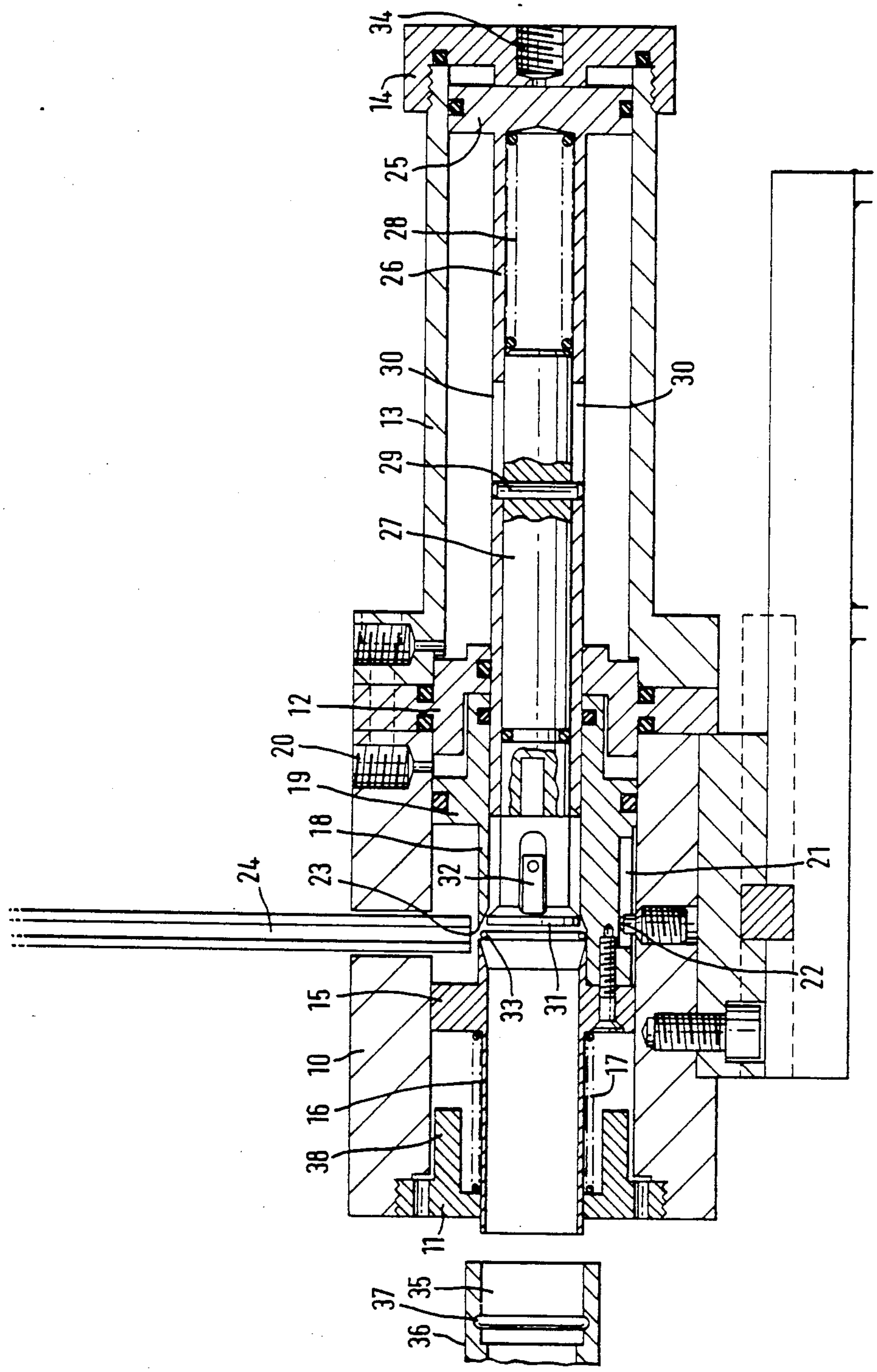
34
14
25
28
26
30
13
29
27
30
12
20
19
18
32
23
24
21
22
15
33
31
10
16
38
11
17
35
37
36

O-RING INSERTION APPARATUS

This invention relates to apparatus for use in inserting a flexible ring, such as an O-ring, into a groove provided in a bore or recess in a workpiece.

SUMMARY OF THE INVENTION

According to the present invention there is provided an apparatus for use in inserting a flexible O-ring into a groove provided in a bore or recess in a workpiece, comprising a first piston and cylinder device provided with a hollow piston rod having a transverse slot for allowing a flexible O-ring to be received in the hollow piston rod, a second piston and cylinder device provided with a hollow piston rod which extends into the bore of the hollow piston rod of said first piston and cylinder device and a plunger received in the piston rod of the second piston and cylinder device, said plunger being provided with radially extending flexible members which in use of the apparatus engage and deform the flexible O-ring which is moved along the bore of the piston rod of the first piston and cylinder device towards the groove in the workpiece.

BRIEF DESCRIPTION OF THE DRAWING

An embodiment of the invention will now be described, by way of an example, with reference to the accompanying drawing, in which the single FIGURE is a longitudinal section through an apparatus according to the present invention.

DETAILED DESCRIPTION

The apparatus comprises a cylinder 10 closed at one end by an end cover 11 and at its other end by an end cover 12 to which is secured one end of a cylinder 13 which is closed at its other end by an end cover 14.

Slidably received in the cylinder 10 is a piston 15 provided on a hollow piston rod 16 which extends through the end cover 11. The piston 15 is acted upon by a coil spring 17 which extends between the piston 15 and the end cover 11. Secured to the piston 15 is a hollow piston rod 18 provided with a piston 19 received in the cylinder 10. The piston 19 is effectively an extension of the piston 15. The cylinder 10 is provided with an inlet 20. The piston rod 18 is provided with an axially extending groove 21 in which is engaged a pin 22 fixed to the cylinder 10. The pin 22 prevents the pistons 15,19 rotating in the cylinder 10.

Provided between the adjacent ends of piston rods 16 and 18 is a slot 23, which when the pistons 15,19 are in the position shown in the drawing, is aligned with a supply chute 24.

Slidably received in the cylinder 13 is a piston 25 provided on a hollow piston rod 26 which extends through the end cover 12 and is received in the bore of the piston rod 18. Slidably received in the piston rod 26 is a plunger 27 acted upon by a coil spring 28. Extending through the plunger 27 is a transverse pin 29 which engages with longitudinally extending slots 30 provided in the piston rod 26. The pin 29 prevents rotation of the plunger 27 relative to the piston rod 26.

The plunger 27 is provided at its forward end with a piston portion 31 slidably received in the bore of the rod 18. The bores of the piston rods 16 and 18 are identical and axially aligned with each other and in the region of the slot 23 each bore gradually increases in diameter in a direction towards the slot 23.

Provided on the forward end portion of the plunger 27 are radially movable flexible members 32 which are diametrically opposed. The members 32 may be in the form of leaf springs having projections on their outer free end or they may comprise spring loaded radially extending plungers.

In operation of the apparatus an O-ring 33 initially passes from the supply chute 24 and through the slot 23 so as to be located in the maximum diameter portion of the bores of the piston rods 16 and 18 as shown in the drawing. Compressed air or other fluid under pressure is admitted to the cylinder 10 through inlet 20 and to cylinder 13 through inlet 34 in the end cover 14. Thus the pistons 15,19 and 25 initially move in unison against the force of spring 17. The forward end of the piston rod 16 enters a bore 35 provided in a workpiece 36, the bore 35 being provided with an external groove 37 for receiving the O-ring 33.

The piston 15,19 is moved into contact with a stop portion 38 provided on the end cover 11 and the piston 25 and plunger 27 continue to move forward. The piston portion 31 of the plunger 27 passes through the bore of the O-ring 33. The flexible members 32 engage the O-ring 33 and cause it to be deformed and the O-ring 33 is pulled along the bore of the hollow piston rod 16 by the plunger 27. The end of the piston rod 16 lies adjacent to the front end·of the groove 37. Plunger 27 continues to travel until the rear angular portion is adjacent to the rear of the groove 37. Piston rod 16 continues to travel compressing spring 28 and pushing the O-ring 33 into the groove 37. The compressed fluid is then exhausted from the cylinder 10 via port 20 and at the same time exhausted from port 34 and allows the spring 28 to expand placing the portion 31 and piston 26 to the position shown in the drawing.

What is claimed is:

1. Apparatus for use in inserting a flexible O-ring into a groove provided in a bore or recess in a workpiece, comprising a first piston and cylinder device provided with a hollow piston rod having a transverse slot for allowing a flexible O-ring to be received in the hollow piston rod, a second piston and cylinder device provided with a hollow piston rod which extends into the bore of the hollow piston rod of said first piston and cylinder device, and a plunger received in the piston rod of the second piston and cylinder device, said plunger being provided with radially extending flexible members which in use of the apparatus engage and deform the flexible O-ring which is moved along the bore of the piston rod of the first piston and cylinder device towards the groove in the workpiece.

2. Apparatus as described in claim 1, in which the first piston and cylinder device comprises two axially spaced apart pistons interconnected by the hollow piston rods with the slot being located between the pistons, the bores of the piston rods gradually increasing towards the slot.

3. Apparatus as claimed in claim 1, in which the free end of the plunger is provided with a piston slidably received in the bore of the hollow piston rod.

4. Apparatus as claimed in claim 1, in which resilient means are provided between the plunger and the piston of the second piston and cylinder device.

5. Apparatus as claimed in claim 1, in which resilient means are provided between the piston of the first piston and cylinder device and an end of the cylinder.

6. Apparatus as claimed in claim 1, including a chute for feeding O-rings into the apparatus.

7. Apparatus as claimed in claim 1, in which the first piston and cylinder device comprises a cylinder and axially spaced apart pistons movable in the cylinder and a stop is provided for limiting the movement of the pistons in the cylinder.

8. Apparatus as claimed in claim 1, in which the first piston and cylinder device comprises a cylinder and axially spaced apart pistons movable in the cylinder and a first pin is provided for preventing rotation of the pistons relative to the cylinder and a second pin is provided in the plunger to prevent rotation relative to the piston rod of the second piston and cylinder device.

9. Apparatus as claimed in claim 1, in which the first and second piston and cylinder devices include respective single acting pistons.

10. Apparatus as claimed in claim 1, in which said radially extending flexible members are in the form of leaf springs.

11. Apparatus as claimed in claim 1, in which said radially extending flexible members are in the form of radially extending plungers.

* * * * *